United States Patent [19]

Fensterer et al.

[11] Patent Number: 4,661,306
[45] Date of Patent: Apr. 28, 1987

[54] FLUID MODERATOR CONTROL SYSTEM REACTOR INTERNALS DISTRIBUTION SYSTEM

[75] Inventors: Howard F. Fensterer, Sun City West, Ariz.; William E. Klassen, Monroeville, Pa.; Luciano Veronesi, O'Hara Township, Allegheny County, Pa.; David E. Boyle, Kiski Township, Armstrong County, Pa.; Robert B. Salton, Plum Borough, Pa.

[73] Assignee: Westinghouse Electric Corp., Pittsburgh, Pa.

[21] Appl. No.: 626,943

[22] Filed: Jul. 2, 1984

[51] Int. Cl.$^4$ .......................... G21C 7/06; G21C 7/32
[52] U.S. Cl. .................... 376/209; 376/221; 376/328; 376/399; 137/561 A
[58] Field of Search ............... 376/209, 221, 229, 327, 376/328, 329, 331, 353, 363, 364, 395, 399, 444, 446, 447, 456; 137/561 A

[56] References Cited

U.S. PATENT DOCUMENTS

| | | |
|---|---|---|
| 3,020,888 | 2/1962 | Braun . |
| 3,081,246 | 3/1963 | Edlund ................................ 376/171 |
| 3,098,812 | 7/1963 | Treshow ............................. 376/210 |
| 3,171,790 | 3/1965 | Challender et al. ................ 376/361 |
| 3,202,584 | 8/1965 | Bogaardt et al. ................... 376/210 |
| 3,247,068 | 4/1966 | Schluderberg et al. ............. 376/177 |
| 3,247,074 | 4/1966 | Schluderberg et al. ............. 376/209 |
| 3,255,087 | 6/1966 | Maldague ........................... 376/209 |
| 3,261,755 | 7/1966 | Mostert .............................. 376/209 |
| 3,275,521 | 9/1966 | Schluderberg et al. ............. 376/177 |
| 3,296,085 | 1/1967 | Peck et al. ......................... 376/401 |
| 3,390,052 | 6/1968 | McDaniels, Jr. . |
| 3,398,050 | 8/1968 | Yevick et al. ...................... 376/171 |
| 3,643,689 | 2/1972 | Isreeli et al. ....................... 137/561 A |
| 3,704,723 | 12/1972 | Wheaton, III et al. ............. 137/341 |
| 3,953,289 | 4/1976 | Costes ................................ 376/461 |
| 4,080,983 | 3/1978 | Stumpmeier . |
| 4,371,495 | 2/1983 | Marlatt . |
| 4,494,568 | 1/1985 | Young ................................ 137/561 A |

FOREIGN PATENT DOCUMENTS 2005391 8/1971 Fed. Rep. of Germany .
2311207 12/1976 France .
2498800 7/1982 France .

OTHER PUBLICATIONS

"Product Engineering", vol. 31, Nov. 21/1960, p. 20.

Primary Examiner—John F. Terapane
Assistant Examiner—Eric Jorgensen
Attorney, Agent, or Firm—Daniel C. Abeles

[57] ABSTRACT

Apparatus is disclosed for introducing a low neutron moderating fluid into the reactor vessel of a spectral shift pressurized water nuclear reactor and for distributing the moderating fluid through the lower core support plate into the fuel assemblies in the core.

9 Claims, 6 Drawing Figures

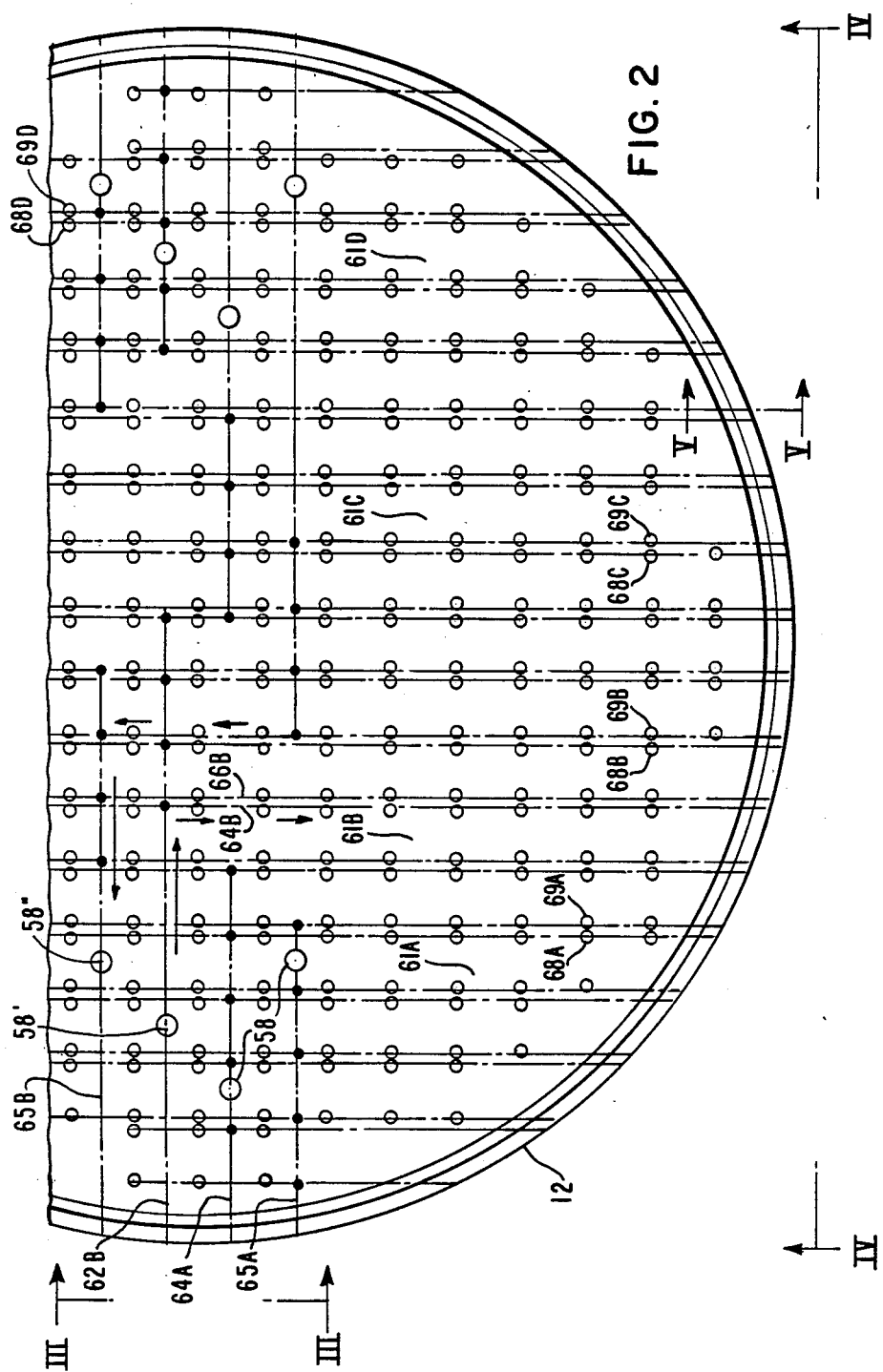

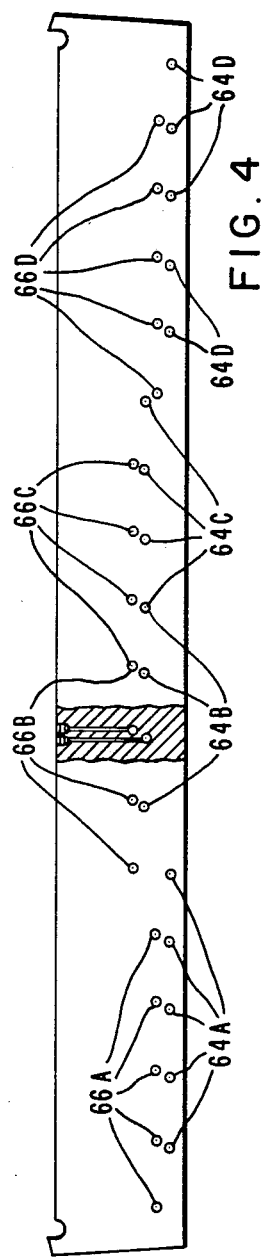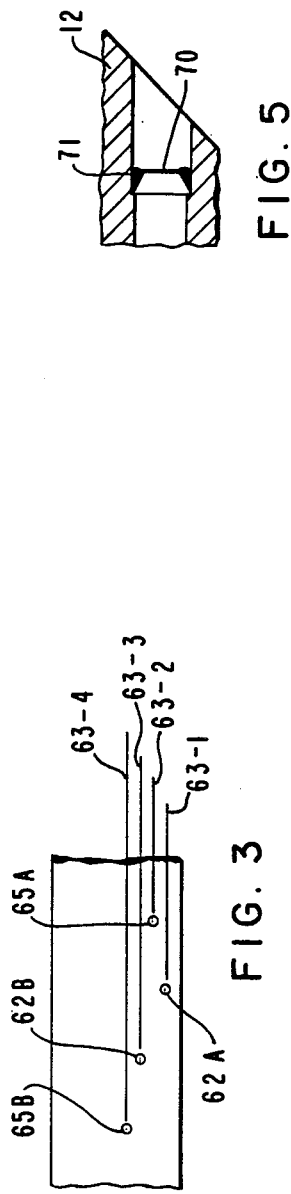

FLUID MODERATOR CONTROL SYSTEM REACTOR INTERNALS DISTRIBUTION SYSTEM

CROSS-REFERENCES TO RELATED APPLICATIONS

This application is related to copending patent applications Ser. No. 626,847 entitled "Fuel Assembly" by R. K. Gjertsen, et al., filed July 2, 1984 (W.E. No. 49,102); and Ser. No. 626,942, entitled "Fluid Moderator Control System Fuel Assembly Seal Connector" by L. Veronesi, et al., filed on July 2, 1984 (W.E. No. 49,104), both of which are assigned to Westinghouse Electric Corporation.

BACKGROUND OF THE INVENTION

1. Field of the Invention

This invention relates in general to the field of spectral shift, pressurized light water nuclear reactors and in particular to a reactor internals system for distributing the flow of a low neutron fluid moderator to the core of the reactor to achieve the spectral shift.

2. Description of the Prior Art

In conventional, state of the art, pressurized light water nuclear reactors, the reactor core is designed to contain excess reactivity. As the reactor operates, the excess reactivity is very gradually consumed until such point as the reactor core will no longer sustain the nuclear reaction and then the reactor must be refueled. Usually this occurs over a period of years. It is very advantageous to maximize the time between reactor refuelings (extend the life of the core) since refueling requires complete shutdown of the reactor and is quite time consuming. Extending the life of the core is usually accomplished by providing the core with a significant amount of excess reactivity.

Typically, control over the fission process, or reactivity control, including control necessitated by the excess reactivity is accomplished by varying the amount of neutron-absorbing materials within the core of the reactor. Control rods which contain neutron-absorbing materials and are movable into and out of the core provide one method of controlling the reactivity. Burnable and nonburnable poisons dissolved in the reactor coolant provide another method of reactivity control. As the reactivity decreases, due to reactor operation, the poisons are gardually removed by being burned by reactor operation or are physically removed by a separate system designed for such purpose. Most often, a combination of dissolved poisons and control rods are used to control the reactor and the excess reactivity.

Unfortunately, control with control rods and poisons, absorb neutrons which could otherwise be used in a productive manner. For example, the neutrons produced by the excess reactivity could be used to convert fertile materials within the fuel assemblies to plutonium or fissile uranium which can then be fissioned and contribute to an even further extension of core life. Thus, while the use of control rods and dissolved poisons provide very effective reactor control, their use comprises a relatively inefficient depletion of high cost uranium. It would be, therefore, advantageous to control the excess reactivity, but not suppress the neutrons associated with the excess reactivity, in order to further extend core life or time between refuelings, and to lower fuel costs.

It is known that fuel element enrichment can be reduced and the conversion ratio of producing fissile materials can be increased by employing a "hardened" (nuclear energy) spectrum during the first part of the fuel cycle to reduce excessive reactivity and to increase the conversion of fertile material to fissile material; then employing a "softer" (lower energy) neutron spectrum during the latter part of the fuel cycle to increase reactivity and extend the core lift by fissioning the previously generated fissile material. One such method utilizing the above is known as spectral shift control which provides a reactor with an extended core life while reducing the amount of neutron-absorbing material in the reactor core. One example of such method of control comprises a mechanical spectral shift reactor whereby hollow displacer rods are provided within fuel assemblies within the core (which, of course, displace an equal volume of water within the fuel assemblies) and which are mechanically withdrawn or punctured to accomplish water flooding of the available volume. In the early stages of core life, the neutron spectrum is hardened by the displacement of a portion of the water within the core by the displacer rods. The spectrum is later softened by the addition of water within the core by the aforesaid rod withdrawal or puncturing. Patent application Ser. No. 217,054 now U.S. Pat. No. 4,432,930 entitled "Spectral Shift Reactor Control Method" by A. J. Impink, Jr., et al., filed on Dec. 16, 1980, assigned to Westinghouse Electric Corporation, discloses one such mechanical spectral shift reactor.

Another method of achieving a spectral shift is to utilize heavy water or deuterium oxide to replace an equivalent volume of core water during the early stages of core life then to gradually reduce the volume of heavy water and replace it with regular reactor coolant (light water) during the later stages of core life. The less effective moderator, heavy water, allows for less fuel enrichment and a higher ratio of converting fertile material to fissile material which in combination provides for a reduction of fuel costs and an extension of core life. An example of this art is found in patent application Ser. No. 626,847 entitled "Fuel Assembly" by R. K. Gjertsen, et al., filed on July 2, 1984 (W.E. No. 49,102) and assigned to Westinghouse Electric Corporation.

In the "Fuel Assembly" patent application, there is explained the need to introduce heavy water into the core support plate for distribution to the fuel assemblies and for eventually exiting the heavy water from the fuel assemblies and through and out of the core support plate.

However, while such requirements of a spectral shift nuclear reactor are well known, to date no apparatus exists which effectively and practically accomplishes such requirements. Also, there is a corresponding need to introduce and exit the deuterium oxide into and out of the pressure vessel. Again, no apparatus to accomplish the same is presently known to exist.

It is, therefore, a primary object of the present invention to provide a distribution system for introducing into the reactor pressure vessel and into the core a moderator which is a less effective moderator than the normal reactor coolant in the early stages of core life and which permits the gradual replacement of the low neutron moderating fluid with the normal reactor coolant during the later stages of core life.

SUMMARY OF THE INVENTION

The present invention comprises a fluid moderator control system and apparatus for introducing a moderator which is less effective than the normal reactor coolant, into the pressure vessel, then into the core support plate where it is distributed to the inlet of each fuel assembly within the core. Return flow from the fuel assemblies, through the core support plate and out of the pressure vessel is also provided for and accomplished by the inventive system and apparatus.

The low neutron moderating fluid is introduced through penetrations welded to and through the pressure vessel which terminate with a bolted flange. A port connects with the bolted flange and to the core support plate. The port includes a slide tube in combination with a bellows to accommodate thermal expansion. The port is ducted through and to the top of the core support plate and connected thereto so that the reactor internals may be removed and reinserted without otherwise disturbing the port.

The core support plate is provided with a plurality of flow zones with each zone receiving and distributing the low neutron moderator to the inlet of the fuel assemblies within each zone and from the outlet of the same fuel assemblies. Separate inlet and outlet ports are used for each zone.

BRIEF DESCRIPTION OF THE DRAWINGS

Various other objects, advantages and features of the invention will become apparent to those skilled in the art from the following discussion taken in conjunction with the following drawings, in which:

FIG. 2 is a plan view of the core support plate showing the details of the flow distribution system;

FIG. 3 is a sectional view of the core support plate of FIG. 2 taken along the line 3—3;

FIG. 4 is a side view of the core support plate of FIG. 3;

FIG. 5 is a schematic view of the core support plate of FIG. 2 taken along the line 5—5; and, FIG. 6 shows another embodiment of the present invention, particularly illustrating introduction of the low neutron moderating fluid from the upper portion of the reactor pressure vessel.

DESCRIPTION OF THE PREFERRED EMBODIMENTS

Figure 1:
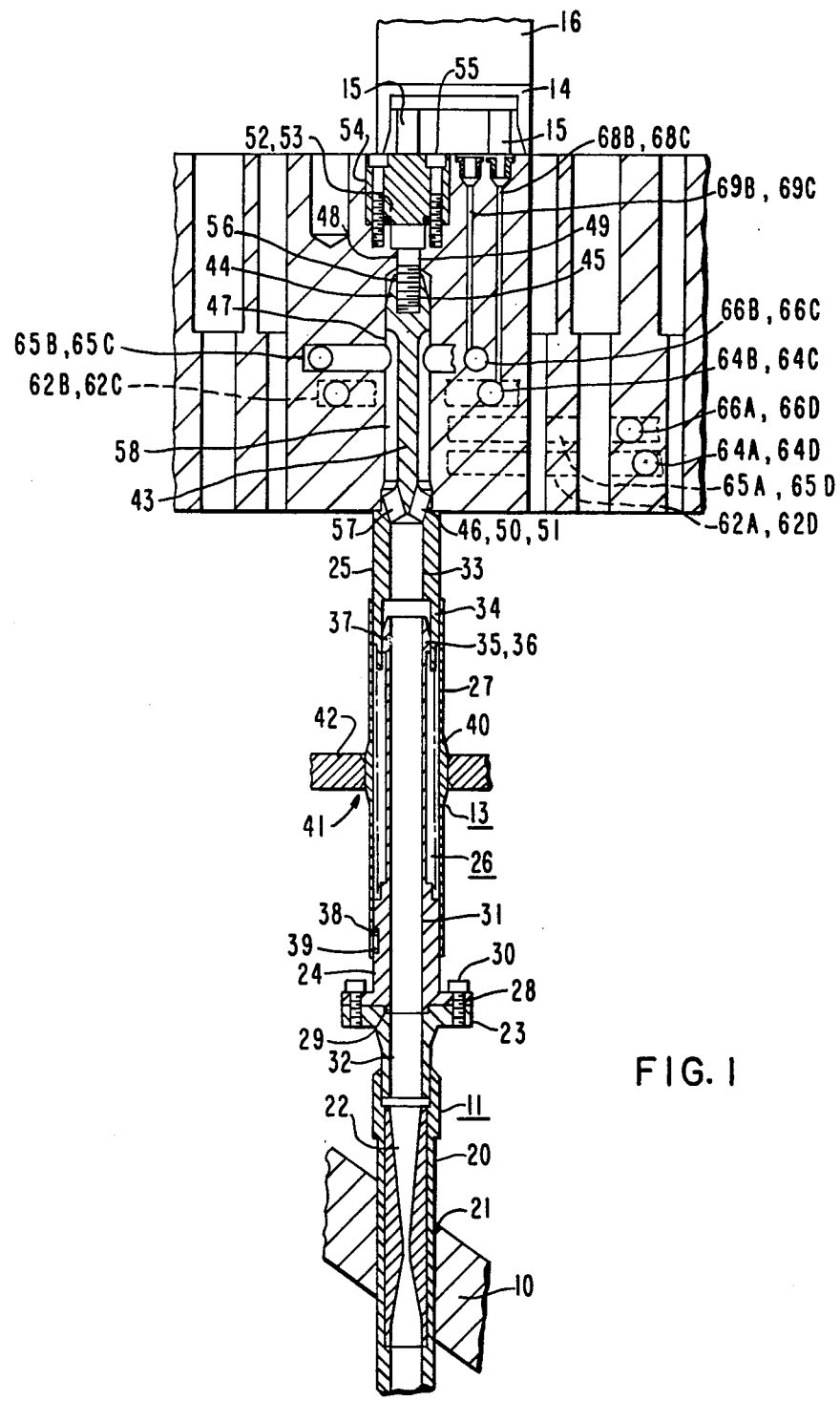
FIG. 1 illustrates one embodiment of the present invention depicting in cross section a lower portion of the reactor pressure vessel and internals including the pressure vessel penetration, port, core support plate and fuel assembly inlet nozzle.

Referring now to FIG. 1 of the drawings and with regard to the particular embodiment depicted therein, there is shown a portion of the pressure vessel 10, a penetration 11 through the wall of the pressure vessel 10, a lower core support plate 12, a port 13 connected between penetration 11 and the core support plate 12, and a lower flow inlet nozzle 14 having a seal connector 15 flow connected to the core support plate 12. A portion of a typical fuel assembly 16 is also shown, a plurality of which comprises the core of the reactor.

Penetration 11 includes a tubular or pipe member 20 which passes through the wall of the pressure vessel 10. A weld 21, around the circumference of tube 20, sealing connects tube 20 to pressure vessel 10. Such penetration of the pressure vessel 10 is well known in the art. A venturi orifice 22 is provided within tube 20 for purposes which will be more fully explained hereinafter. A bolted flange 23 is sealed and structurally welded to tube 20. Penetration 11 comprises one of a plurality of inlet penetrations or outlet penetrations to pressure vessel 10. A low neutron moderator fluid such as deuterium oxide is caused to flow within penetration 11 so as to displace a portion of the core coolant within the fuel assemblies 16 with a predetermined amount of deuterium oxide which amount is consistent with the need at that given time to harden the nuclear spectrum and effectuate the spectral shift. The control of the flow of the deuterium oxide is more completely described in copending U.S. patent application Ser. No. 626,942 entitled "Fluid Moderator Control System Fuel Assembly Seal Connector" by L. Veronesi, et al., filed on July 2, 1984 (W.E. No. 49,204) and assigned to Westinghoue Electric Corporation and accordingly will not be further explained herein except as it may apply to the instant invention.

Port 13 flow connects penetration 11 with the flow channels in the core support plate 12. Port 13 comprises a lower substantially cylindrical member 24, an upper member 25, a bellows 26 connecting upper member 25 to lower member 24, and a skirt 27 surrounding bellows 26. As shown and described, port 13 is structurally connected at one end to flange 23 and at the other end to core support plate 12. Bellows 26 permits relative motion between upper member 25 and lower member 24 while maintaining a seal therebetween.

Lower member 24 of port 13 includes a flange 28 which sealingly mates with flange 23 on penetration 11. A metal "o" ring seal 29 may be used to effectuate the seal between flanges 23 and 28. Bolts 30 structurally secure flange members 23 and 28. A flow channel 31 within lower member 24 is axially aligned with the flow channel 32 in penetration 11 and with the flow channel 33 in upper member 25. Flow channels 31, 32 and 33 provide flow communication for the deuterium oxide introduced and controlled by said fluid moderator control system to the core support plate 12.

Upper member 25 of port 13 includes a lower cylindrical portion 34 which telescopically mates with the free upper end of member 24. One or more ring seals 35 which fit within circumferential grooves 36 in the free end 37 of member 24 provide a sliding seal between members 24 and 25. One end of bellows 26 is seal welded to the lower end 34 of member 25 while the other end of bellows 26 is seal welded to a cylindrical portion of member 24 in the vicinity of flange 24. In this manner, bellows 26 is given a length which provides for the differential thermal expansion between upper 25 and lower 24 members while minimizing any spring force exerted by bellows 26 resulting from such differential expansion. Skirt 27 may be secured at one end thereof to either upper member 25 or lower member 24. As shown, skirt 27 is welded to member 25. A tab 38 on the unsecured end of skirt 27 fits within a slot 39 in member 24 so as to limit the unrestrained motion between members 24 and 25 prior to assembly to the reactor and to prevent damage to telescoping portions of members 24 and 25. The control portion 40 of skirt 27 is slightly enlarged so as to fit closely within an opening 41 in guide plate 42 and to limit any lateral deflection of port 13 during reactor operation. A greater amount of clearance is provided between opening 41 and the main portions of skirt 27 to facilitate assembly of guide plate 42 over the plurality of ports 13 co-extending from the bottom of the reactor vessel 10.

The upper end of member 25 provides for attachment of port 13 to the lower core support plate 12 and for ducting the flow of the low neutron moderating fluid from within flow channel 33 (which is in flow communication with port 13) to one or more horizontal flow channels within core support plate 12. As previously described, the lower end of member 25 comprises a cylindrical hollow tube 36 (with flow channel 33 comprising the hollow center of said cylindrical tube) which telescopically mates with a plunger upper end 37 of lower member 24 of port 13. Flow channel 33 terminates within the lower end 36 of member 25 at a position slightly below the lower surface of the core support plate 12. Slightly above the terminal end of flow channel 33, the cylindrical portion 36 of member 25 necks down to form shank 43 having a solid circular cross-sectional shape. The shank extends upwards toward the end 44 of member 25 where the cross-sectional diameter is enlarged and is axially drilled and internally tapped 45. A shoulder 46 is formed between the shank 43 and cylindrical tube 36. Shoulder 46 fits against the lower surface of the core support plate 12. Shank 43 and enlarged end 44 fit within an opening 47 in core support plate 12. A bolt 48 fitted through an opening 49 in the upper side of core support plate 12 threadingly engages with the enlarged upper end 44. Tightening bolt 48 causes shoulder 46 to firmly seat against the lower surface of the core support plate 12 and to effectuate a leakfree joint due to "o" ring seal 50 in groove 51 in shoulder 46. The opening 49 for bolt 48 is sealed by the use of another metallic "o" ring 52 provided within a groove 53 of cylindrical block 54 which is bolted by use of bolts 55 within the upper end of core support plate 12. In the manner provided, ports 13 may be assembled to the flanges 23 of penetrations 11 at the bottom of the pressure vessel 10 and then the reactor internals including the core support plate 12 may be lowered into position over the upper ends 44 of member 25. A tapered surface 56 also provided at end 44 facilitates such installation. Tightening of bolt 48 and installation of block 54 completes the assembly procedure.

The flow of the low moderating fluid from within flow channel 33 to the core support plate 12 is, as mentioned above, provided for by the upper end of member 25. One or more holes 57 are drilled at an angle (relative to the axial center line of member 25) from the intersection of shank 43 and cylindrical tube 36 into the opening comprising flow channel 33. Holes 57 provide flow communication between channel 33 and the distribution or the core support plate ilet flow channel 58 formed by hole 47 in core support plate 12 and the necked-down portion or shank 43 of member 25. It being noted that "o" ring seals 50 and 52 effectively seal off distribution channel 58 except for the horizontal openings in lower core support plate 12.

FIG. 2 shows in detail one method of distributing the flow of the low neutron moderating fluid within the lower core support plate 12 (from flow channels 58 to the seal connectors 15 of the fuel assemblies) and for returning the flow of said fluid from the seal connectors 15 back through the lower core support to flow channels 58. In this regard, it is to be noted that seal connectors 15 may act as flow inlet or flow outlet connectors depending upon their location with respect to flow nozzle 14. Further explanation of this aspect may be found in the above-referenced copending patent application by R. K. Gjertsen, et al.

The core support plate is divided into four separate regions 61A, 61B, 61C and 61D. Each region is simultaneously supplied with the low neutron moderating fluid introduced through a corresponding flow channel 58 in the core support plate 12. Such an arrangement facilitates uniform flow to each fuel assembly and precludes large reactivity additions in the unlikely event of an inadvertent displacement of the low neutron moderating fluid with a high neutron moderator such as the light water reactor coolant.

In order to provide the fuel assemblies within each region, 61A, 61B, 61C, 61D, with the low neutron moderator, a horizontal network of inlet and outlet flow channels is provided for each region 61A, 61B, 61C and 61D.

For simplicity, the flow arrangement for region 61B only will be described. It will be noted, however, that the same arrangement is applicable to the other regions 61A, 61C and 61D, although not explained in detail. Still referring to FIGS. 1 through 4, region 61B may be classified as a center region. A single flow inlet channel 58' (FIG. 2) intersects a single main feed line 62B which is horizontally drilled at level 63-3. Branch feed lines 64B are also drilled horizontally at the same level as line 62B but at right angles to each other. In region 61B there are four branch feed lines 64B.

A single main exit flow line 65B (intersecting with another channel 58') (FIG. 2) also services region 61B. Similarly, four branch exit flow lines 66B services region 61B, which flow lines intersect with lines 65B and are all at the same level 63-4 with each other. The main exit line 65B is at right angles to the four branch exit lines 66B.

As can be seen in FIGS. 3 and 4, levels 63-3 and 63-4 are different. Thus, none of the main or branch inlet lines interfere with the main or branch exit lines. A vertical flow line 66B is provided at the intersection of each inlet seal connector of a fuel assembly and the branch feed lines 64B while lines 69B are provided at the intersection of each outlet seal connector of a fuel assembly and the exit branch lines 66B. The arrangement thus provides a complete flow path within region 61B from channel 58 to each inlet flow seal connector and from each exit flow seal connector back to a different flow channel 58. The inlet and outlet flow paths in regions 61A, 61C and 61D are similar to that described for regions 61B.

Although there are two levels of flow lines (inlet and exit) for each region 61A–61D, the arrangement shown in FIGS. 1 through 4 requires a total of only four different levels. By way of clarification, flow level 63-1 services lines 62A, 62D, 64A and 64D; level 63-2 services lines 65A, 65D, 66A and 66D; level 63-3 services lines 62B, 62C, 64B and 64C; and, level 63-4 services lines 65B, 65C, 66B and 66C. In other words, each level services two functions for each of two flow regions. There are, of course, distinct advantages in minimizing the total number of flow line levels. It simplifies machining; it minimizes the possibility of interference with the main coolant flow channels through the lower core support plate 12. Other advantages will be apparent to one skilled in the art.

All of the above-described horizontal flow lines may be gun drilled in the lower core support with the entrance or exit to the drilled hole sealed by a plug 70 fitted within the hole and seal welded 71 around its periphery as shown in FIG. 5. In the alternative, a method of horizontal flow distribution can be accomplished by attaching a piping manifold to either or both of the upper and lower surfaces of the lower core support plate 12.

Figure 6:
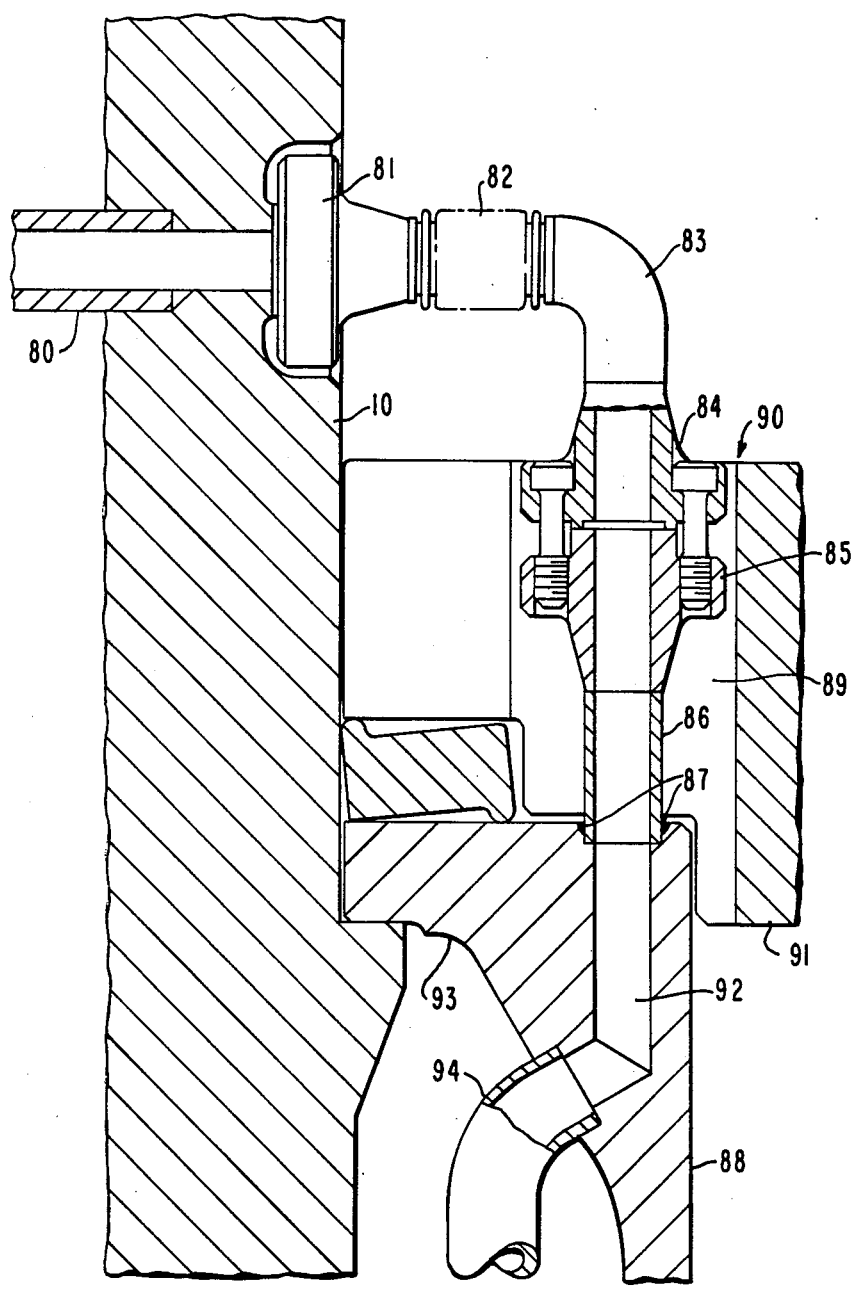

FIG. 6 depicts an alternate method to supply the low neutron moderating fluid to the lower core support plate distribution system shown in FIGS. 2 through 5. In this embodiment, the fluid is introduced into the reactor vessel 10 through top entry (as opposed to the bottom entry of FIG. 1). One or more penetrations 80 are welded to the pressure vessel in normal fashion. A flange 81 is welded to the internal diameter of the pressure vessel 10 at the location of penetration 80. A bellows 82, an elbow 83 and a bolted flange half 84 are connected to welded flange 81. The other half 85 of bolted flange is welded to a connecting pipe 86 which is in turn welded 87 to the upper flange of the lower barrel 88. Bellows 82 provides for differential thermal expansion between the reactor internals and the pressure vessel 10. Bolted flange halves 84 and 85 and connecting pipe 86 fit within an opening 89 in the flange 90 of the upper core support plate 91. The bolted flange 84 and 85 is provided to permit removal of elbow 83 if the lower internals are to be removed from the pressure vessel 10. A flow channel 92 is provided in flange 93 of the lower barrel 88. A pipe 94 welded thereto and connected at its lower end to the horizontal flow inlet channels in the lower core support plate 12, completes the flow distribution system. The flow channel shown in FIG. 6 may be used for fluid moderator inlet or outlet flow.

Venturi 22 comprises an insert within penetration 20 to permit flow of the low neutron moderating fluid to the core of the reactor but restrict outward flow of the moderating fluid in the very unlikely event of a double failure of penetration 20 outside the pressure vessel 10 and one or more of the seal connectors 15. Venturi 22 is of a type which is well known in the art.

The apparatus disclosed above has been described with regard to introducing a fluid such as deuterium oxide into the reactor core in order to effectuate spectral shift. The inventive apparatus is, of course, not intended to be limited to the flow of deuterium oxide. The flow of a suitable low moderating fluid may be used with the inventive apparatus. Additionally, the inventive apparatus contemplates the flow of a mixture of the low neutron moderating fluid in combination with the normal reactor coolant depending upon the degree of moderation required or desired at any time in accordance with the amount of excess reactivity then present in the core.

The inventive apparatus even further contemplates the ultimate displacement of the low neutron moderating fluid with the normal reactor coolant during the later stages of core life when a maximum amount of moderation is required especially when a soft nuclear spectrum is desired.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim:

1. In a spectral shift pressurized water nuclear reactor employing a low neutron moderating fluid for the spectral shift including a reactor pressure vessel, a core comprising a plurality of fuel assemblies, a core support plate, apparatus comprising means for penetrating the reactor vessel for introducing said moderating fluid into said reactor vessel, means associated with the core support plate for directly distributing said moderating fluid to and from said fuel assemblies comprising at least one inlet flow channel in said core plate; a plurality of branch inlet feed lines connected to said inlet flow channel in said core plate; a plurality of vertical inlet flow lines flow connected to said branch inlet feed lines; each vertical flow line communicating with a fuel assembly; said distribution means further comprising a plurality of lines serving as return flow lines, each of which is connected to one of said fuel assemblies; a plurality of branch exit flow lines in said core plate flow connected to said return flow lines of the fuel assembly; and at least one outlet flow channel flow connected to said branch exit flow lines; and a flow port interposed between said penetration means and said distribution means for flow connecting said penetration means with said distribution means.

2. The apparatus of claim 1, including at least two separate flow regions associated with said core support plate with each region including an inlet channel, a branch inlet feed line, a vertical flow line from the core support plate to a fuel assembly, a return flow line from the fuel assembly to the core support plate, a branch exit flow line, and an outlet flow channel in the core support plate.

3. The apparatus of claim 1, wherein said means for penetrating the reactor vessel comprises a pipe passing through the wall of said reactor vessel, said pipe being seal welded to said reactor vessel, the end of said pipe within said reactor vessel having a flange thereon.

4. The apparatus of claim 3, wherein said penetration means includes a venturi orifice within said pipe.

5. The apparatus of claim 1, wherein said flow port comprises an elongated hollow pipe fixedly connected at one end to said pentration means, and fixedly connected at the second end thereof to the core support plate, said flow port having means between said ends for sealingly varying the length of said flow port between said ends.

6. The apparatus of claim 5, wherein said flow port comprises a first member attached to said core support plate, a second member attached to said penetration means and said sealing means comprises a bellows fixedly connected at one end to said first member and fixedly connected at its other end to said second member.

7. The apparatus of claim 6, wherein the unconnected ends of said first and second members are telescopically arranged with a slideable seal therebetween.

8. The apparatus of claim 7, wherein the unconnected ends of said first member comprises an elongated hollow tube portion, a flow channel is formed in the core support plate which communicates with said elongated hollow tube, with said elongated hollow tube partially closed at its end by an elongated solid rod portion connected thereto, at the intersection of the elongated hollow tube and the solid rod portion; a shank at the intersection of said elongated hollow tube and said solid rod portion extending into said flow channel of said core support plates, said shank having at least one hole therethrough which provides flow communication between the elongated hollow tube and the flow channel in said core support plate.

9. In a spectral shift pressurized water nuclear reactor employing a low neutron moderating fluid for the spectral shift including a reactor pressure vessel, a core comprising a plurality of fuel assemblies, a core support plate; at least one means for penetrating the reactor vessel and for introducing said moderating fluid into said reactor vessel; means associated with the core support plate for directly distributing said moderating fluid to and from said fuel assemblies comprising at least one inlet flow channel in said core plate; a plurality of branch inlet feed lines connected to said inlet flow channel in said core plate; a plurality of vertical flow lines flow connected to said branch inlet feed lines, each vertical flow line communicating with a fuel assembly; said distribution means further comprising a plurality of lines serving as return flow lines, each of which is connected to one of said fuel assemblies; a plurality of branch exit flow lines in said core plate flow connected to said return flow lines of the fuel assembly; and at least one outlet flow channel flow connected to said branch exit flow lines; and a flow port interposed between each said penetration means and said distribution means for flow connecting said penetration means with said distribution means.

* * * * *